US010850982B2

(12) United States Patent
Beckmann et al.

(10) Patent No.: US 10,850,982 B2
(45) Date of Patent: Dec. 1, 2020

(54) STABILIZATION OF SODIUM DITHIONITE BY MEANS OF VARIOUS ADDITIVES

(71) Applicant: BASF SE, Ludwigshafen (DE)

(72) Inventors: Eberhard Beckmann, Neustadt (DE); Sabine Weiguny, Freinsheim (DE); Martin Gärtner, Worms (DE); Katharina Federsel, Eppelheim (DE)

(73) Assignee: BASF SE (DE)

( * ) Notice: Subject to any disclaimer, the term of this patent is extended or adjusted under 35 U.S.C. 154(b) by 78 days.

(21) Appl. No.: 15/569,792

(22) PCT Filed: Apr. 19, 2016

(86) PCT No.: PCT/EP2016/058612
§ 371 (c)(1),
(2) Date: Oct. 27, 2017

(87) PCT Pub. No.: WO2016/173884
PCT Pub. Date: Nov. 3, 2016

(65) Prior Publication Data
US 2018/0134557 A1 May 17, 2018

(30) Foreign Application Priority Data
Apr. 29, 2015 (EP) .................................... 15165621

(51) Int. Cl.
| C01B 17/66 | (2006.01) |
| D21C 9/10 | (2006.01) |
| D06P 1/00 | (2006.01) |
| D06L 4/30 | (2017.01) |
| D06P 1/673 | (2006.01) |
| D06P 1/647 | (2006.01) |
| D06L 4/13 | (2017.01) |

(52) U.S. Cl.
CPC .............. *C01B 17/665* (2013.01); *D06L 4/13* (2017.01); *D06L 4/30* (2017.01); *D06P 1/0004* (2013.01); *D06P 1/647* (2013.01); *D06P 1/6735* (2013.01); *D06P 1/67341* (2013.01); *D06P 1/67366* (2013.01); *D06P 1/67375* (2013.01); *D21C 9/1089* (2013.01)

(58) Field of Classification Search
None
See application file for complete search history.

(56) References Cited

U.S. PATENT DOCUMENTS

| 3,669,895 | A | | 6/1972 | Shastri | |
| 3,819,807 | A | | 6/1974 | Schreiner et al. | |
| 4,680,136 | A | * | 7/1987 | Bernhard | ................ C01B 17/66 252/188.2 |
| 5,126,018 | A | * | 6/1992 | Stutts | ........................ C25B 1/14 204/294 |
| 5,188,807 | A | * | 2/1993 | Ko | .......................... C01B 17/66 366/338 |
| 5,202,505 | A | * | 4/1993 | Murphy | ................... C07C 37/72 568/749 |
| 5,296,210 | A | | 3/1994 | Oglesby | |
| 5,336,479 | A | * | 8/1994 | Munroe | .................. C01B 17/66 423/515 |
| 2014/0047837 | A1 | | 2/2014 | Wortmann et al. | |
| 2016/0348243 | A1 | | 12/2016 | Xu et al. | |
| 2017/0009749 | A1 | | 1/2017 | Wortmann et al. | |
| 2017/0010024 | A1 | | 1/2017 | Wortmann et al. | |
| 2017/0074597 | A1 | | 3/2017 | Wortmann et al. | |
| 2017/0205151 | A1 | | 7/2017 | Wortmann et al. | |

FOREIGN PATENT DOCUMENTS

| AU | 2016214399 A1 | 8/2017 |
| CN | 103938472 A | 7/2014 |
| CN | 103959505 A | 7/2014 |
| DE | 1592013 A1 | 2/1971 |
| DE | 2041566 A1 | 2/1972 |
| DE | 2107959 A1 | 8/1972 |
| DE | 2657329 A1 | 6/1977 |
| DE | 2703282 A1 | 8/1978 |
| GB | 1148248 A | 4/1969 |
| WO | WO-2014026892 A1 | 2/2014 |
| WO | WO-2015110492 A1 | 7/2015 |
| WO | WO-2015110594 A1 | 7/2015 |
| WO | WO-2015118052 A1 | 8/2015 |
| WO | WO-2015173331 A1 | 11/2015 |
| WO | WO-2016001184 A1 | 1/2016 |
| WO | WO-2016124709 A1 | 8/2016 |
| WO | WO-2016142226 A1 | 9/2016 |
| WO | WO-2016173884 A1 | 11/2016 |

OTHER PUBLICATIONS

International Search Report for PCT/EP2016/058612 dated Jun. 14, 2016.

(Continued)

*Primary Examiner* — Joseph D Anthony
(74) *Attorney, Agent, or Firm* — Faegre Drinker Biddle & Reath LLP

(57) ABSTRACT

The present invention relates to a method for reducing or preventing the decomposition of a composition Z comprising Z1 a salt of dithionous acid in an amount ranging from 50 to 100 wt % and optionally Z2 an additive selected from the group consisting of alkali metal carbonate, alkaline earth metal carbonate, alkali metal or alkaline earth metal tripolyphosphate ($Na_5P_3O_{10}$), alkali metal or alkaline earth metal sulfite, disulfite or sulfate, dextrose and complexing agents in a combined amount ranging from 0.0001 to 40 wt %, which comprises contacting the components Z1 and optionally Z2 in the solid and/or dry or solvent-dissolved or -suspended state with at least one of the following compounds V in the solid and/or dry or solvent-dissolved or -suspended state, wherein the compounds V are selected from the group consisting of: (a) oxides of the alkali metals lithium, sodium, potassium, rubidium, cesium, or of magnesium, (b) sodium tetrahydroborate ($NaBH_4$), (c) anhydrous copper(II) sulfate ($Cu(SO_4)$), phosphorus pentoxide and (d) basic amino acids arginine, lysine, histidine, wherein the solvent for Z1, optionally Z2 and V is practically water-free.

13 Claims, No Drawings

(56) References Cited

OTHER PUBLICATIONS

Written Opinion of the International Searching Authority for PCT/EP2016/058612 dated Jun. 14, 2016.
U.S. Appl. No. 15/557,178, filed Sep. 11, 2017.
U.S. Appl. No. 15/548,991, filed Aug. 4, 2017.
U.S. Appl. No. 15/569,792, filed Oct. 27, 2017.
Extended European Search Report for Application No. 15165621.2, dated Oct. 14, 2015.

* cited by examiner

STABILIZATION OF SODIUM DITHIONITE BY MEANS OF VARIOUS ADDITIVES

CROSS-REFERENCE TO RELATED APPLICATIONS

This application is a national stage application (under 35 U.S.C. § 371) of PCT/EP2016/058612, filed Apr. 19, 2016, which claims benefit of European Application No. 15165621.2, filed Apr. 29, 2015, both of which are incorporated herein by reference in their entirety.

The present invention relates to a method for reducing or preventing the decomposition of a composition Z comprising a salt of dithionous acid and to Z compositions comprising a salt of dithionous acid, respectively as defined in the claims.

It is known that, for example, sodium dithionite ($Na_2S_2O_4$), or products comprising for example sodium dithionite ($Na_2S_2O_4$), at a comparatively high temperature of about 80° C. and/or in the presence of water or protic acids are capable of spontaneously and violently decomposing to release inter alia sulfur dioxide, this being undesirable if only for safety reasons. Even at an ambient temperature of about 20° C., a gradual decomposition of for example sodium dithionite may take place, which may for example become noticeable by undesirable sulfur dioxide odor from opened containers of a commercial product comprising sodium dithionite. The dithionite content of the product typically decreases as a consequence of said decomposition, as does in general also its quality, for example reduction power. In addition, caking and clumping of the product may occur to compromise any metering in further processing. It is also possible that the decomposition reaction of the salt of dithionous acid and/or of an additive thereto (sodium carbonate for example) may result in the formation of gases which leads to the buildup of pressure in the closed containers containing for example sodium dithionite ($Na_2S_2O_4$). These disadvantageous effects may all occur together or independently of each other.

To eliminate or at least reduce these disadvantages, it has already been proposed that various materials, for example barium oxide or calcium oxide, be added to sodium dithiunite in particular, as is derivable for example from U.S. Pat. No. 5,296,210 (Hoechst Celanese Corporation), column 1 line 51 to column 2 line 58 and the literature cited therein.

The problem with the decomposition tendency and the typically associated caking, odor and pressure buildup issues of the prior art dithionites is still awaiting its optimum solution, so there is still room for improvement here.

It is an object of the present invention to provide salts of dithionous acid, especially sodium dithionite, which are more stable to decomposition, so that, for example, dithionite-containing products are safer to transport and/or store for a prolonged period and/or under elevated temperature and/or relative humidity without significant degradation of the active dithionite content and the caking, odor and pressure buildup problems described above are at least partly reduced or eliminated.

We have found that this object is achieved by the present method and the present composition.

Salts Z1 of dithionous acid ($H_2S_2O_4$)—the acid itself has as yet not been isolated—are herein any metal salts or substituted ($NR_4^+$) or unsubstituted ($NH_4^+$) ammonium salts of this acid, for example the alkali metal salts, alkaline earth metal salts, salts of the metals of group 12 of the periodic table, and also ammonium ($NH_4^+$) salts.

Preferred salts of dithionous acid Z1 are herein sodium dithionite ($Na_2S_2O_4$), potassium dithionite ($K_2S_2O_4$), calcium dithionite ($CaS_2O_4$), zinc dithionite ($ZnS_2O_4$), ammonium dithionite (($NH_4)_2S_2O_4$), very particular preference being given to sodium dithionite ($Na_2S_2O_4$). These and other dithionites are also referred to as "hydrosulfite(s)" herein and among those skilled in the art.

Salts of dithionous acid Z1, including those preferred above, comprise the compound on its own, more preferably sodium dithionite ($Na_2S_2O_4$) on its own, but also compositions comprising a salt of dithionous acid, more preferably sodium dithionite ($Na_2S_2O_4$), which may each comprise further, secondary constituents singly or in any desired combination, for example water, including in the form of crystal water, e.g., sodium dithionite dihydrate $Na_2S_2O_4 \times 2\, H_2O$, alcohols, sulfites ($SO_3^{2-}$), disulfites ($S_2O_5^{2-}$), thiosulfates ($S_2O_3^{2-}$), formates ($HCOO^-$) and further sulfur-containing, organic and inorganic components, the combined amount of these secondary constituents being typically in the range from 0.0001 to 20 wt %, based on component Z1. The secondary constituents referred to are typically, with sodium dithionite in particular, the result of the production process for the salt of dithionous acid.

A particularly preferred salt of dithionous acid herein is sodium dithionite ($Na_2S_2O_4$) or $Na_2S_2O_4 \times 2\, H_2O$, which is for example described in Ullmann's Encyclopedie of Industrial Chemistry, Wiley-VCH Verlag GmbH & Co. KGaA, Weinheim, 20102, pages 701 to 704 (DOI: 10.1002/14356007.a25_477), herein referred to as "Ullmann", and is available commercially, for example Blankit® or Blankit® S sodium dithionite from BASF SE.

Sodium dithionite can be commercially manufactured in various ways, for example using the so-called formate process. For details see Ullmann, DE 1592013 A or DE 27 03 282 A.

The composition Z comprises the Z1 dithionous acid salt as described above, including all embodiments, specifically sodium dithionite, in an amount ranging from 50 to 100 wt %, preferably from 70 to 95 wt %, all based on the composition Z.

The composition Z may further comprise an additive Z2, preferably selected from the group consisting of alkali metal carbonate, alkaline earth metal carbonate, more preferably practically crystal water free sodium carbonate ($Na_2CO_3$), alkali metal or alkaline earth metal tripolyphosphate ($Na_5P_3O_{10}$), alkali metal or alkaline earth metal sulfite, disulfite or sulfate, dextrose, complexing agents including for example ethylenediaminetetraacetic acid ($C_{10}H_{16}N_2O_8$) or its salts or nitrilotriacetic acid ($C_6H_9NO_6$) or its salts, in a total amount ranging from 0.0001 to 40 wt %, preferably from 0.0001 to 10 wt %, more preferably from 1 to 5 wt %, all based on the composition Z.

The compounds V are selected from the group consisting of:
  (a) oxides of the alkali metals lithium, sodium, potassium, rubidium, cesium, such as $Li_2O$, $Na_2O$, $K_2O$, or of magnesium, such as MgO, preferably lithium oxide $Li_2O$, sodium oxide $Na_2O$, magnesium oxide MgO;
  (b) sodium tetrahydroborate ($NaBH_4$);
  (c) anhydrous copper(II) sulfate ($Cu(SO_4)$), phosphorus pentoxide and
  (d) basic amino acids arginine, lysine, histidine, preferably arginine, lysine.

The sum total of the components forming the composition Z is 100%.

One embodiment (I) of compositions Z, more preferably comprising sodium dithionite Z1, comprises no additive Z2.

A further embodiment (II) of the compositions Z, more preferably comprising sodium dithionite Z1, does comprise an additive Z2, preferably selected from the group consisting of alkali metal or alkaline earth metal carbonate, more preferably practically crystal water free sodium carbonate ($Na_2CO_3$), alkali metal or alkaline earth metal tripolyphosphate ($Na_5P3O_{10}$), alkali metal or alkaline earth metal sulfite, disulfite or sulfate, dextrose, complexing agents including for example ethylenediaminetetraacetic acid ($C_{10}H_{16}N_2O_8$) or its salts or nitrilotriacetic acid ($C_6H_9NO_6$) or its salts, in a total amount ranging from 0.0001 to 40 wt %, preferably from 0.0001 to 10 wt %, more preferably from 1 to 5 wt %, all based on the composition Z.

A further embodiment (III) of compositions Z, more preferably comprising sodium dithionite Z1, comprises the compounds V selected from the group consisting of: (a) oxides of the alkali metals lithium, sodium, potassium, rubidium, cesium, such as $Li_2O$, $Na_2O$, $K_2O$, or of magnesium, such as MgO, preferably lithium oxide $Li_2O$, sodium oxide $Na_2O$, magnesium oxide MgO; (b) sodium tetrahydroborate ($NaBH_4$); (c) anhydrous copper(II) sulfate ($Cu(SO_4)$), phosphorus pentoxide and (d) basic amino acids arginine, lysine, histidine, preferably arginine, lysine, more preferably magnesium oxide MgO, sodium tetrahydroborate ($NaBH_4$) in a total amount ranging from 0.01 to 0.9 wt %, except for NaBH4 which may also be present in a total amount ranging from 0.01 to 5 wt %.

A further embodiment (IV) of the compositions Z, more preferably comprising sodium dithionite Z1, represents the combination of the above embodiments (I) and/or (II) with the embodiment (III).

The composition Z is generally obtained by contacting the components Z1 and optionally Z2, as defined above including all embodiments, in the solid and/or dry state or in a solvent-dissolved or suspended state with at least one of the compounds V defined above including all embodiments, in the solid and/or dry state or in a solvent-dissolved or suspended state.

The component Z1, more preferably sodium dithionite, is obtainable using the known processes, preferably with the formate process as described for example in Ullmann.

Solvent or suspension media for the Z1, Z2 and V components defined above including all embodiments are practically anhydrous, preferably comprising less than 1000 weight ppm, more preferably less than 100 weight ppm of water.

Very suitable solvents of this type are typically those which under customary conditions, for example at about 20 to 50° C., do not effect a chemical decomposition of components Z1, Z2 and V, and/or those which are water miscible, such as open-chain $C_2$ to $C_{10}$ ethers, for example diethyl ether, cyclic $C_4$ to $C_{10}$ ethers such as tetrahydrofuran, aliphatic $C_1$ to $C_6$ alcohols, more preferably methanol, ethanol, the isomers of propanol and also butanol, more preferably ethanol and methanol, most preferably methanol or else or cycloaliphatic $C_5$ to $C_8$ alcohols, such as cyclohexanol.

In a very suitable process, the filtercake obtainable after the synthesis of the Z1 dithionite, preferably the Z1 sodium dithionite derived via the formate process, is preferably freed of water as far as possible and is contacted with a suspension or one of the V compounds defined above including all embodiments, in the dissolved or preferably suspended state. This is customarily accomplished at ambient temperature, for example 15 to 30° C. and standard pressure at about 1 atm (absolute). But it is also possible to employ higher or lower temperatures and/or pressures.

In a further very suitable process, the still solvent-moist product obtainable after the synthesis of the Z1 dithionite, preferably the Z1 sodium dithionite derived via the formate process, is dried using customary methods, preferably including under reduced pressure, and then contacted with one of the V compounds defined above including all embodiments, in the solid and/or dry state. This is customarily accomplished at ambient temperature, for example 15 to 30° C. and standard pressure at about 1 atm (absolute). But it is also possible to employ higher or lower temperatures and/or pressures.

The solid state herein is generally that state in which the V compounds defined above including all embodiments are not liquid or pasty but free-flowingly particulate, generally being in the form of a pulverulent or granular material, for example with a central value particle diameter in the range from 0.1 to 10 mm.

The dry state is generally that state in which the V compounds defined above including all embodiments practically no longer comprise suspension or solvent media, preferably in this state comprising less than 1 wt % of solvent or suspension medium, for example organic solvents such as carboxylic acids, alcohols and/or water.

To the best of our current knowledge, the order in which components, Z1, optionally Z2 and V are contacted is not critical. For instance, component V can be added to Z1 and optionally Z2, but the reverse order is possible as well.

The step of contacting the components Z1, optionally Z2 and V may be effected in any customary manner, as by merely adding one or more components from Z1, Z2 and V to the respective other component(s), or by mixing in or with the apparatus typically used therefor, for example a vibratory chute or a mixer of various kinds, which generally leads to a uniform distribution of components Z1, Z2 and V in the composition Z.

The step of contacting the components Z1, optionally Z2 and V in solution or suspension may likewise be accomplished in any customary manner, for example by spraying or in a filter.

The step of contacting the components Z1, optionally Z2 and V, however, may also consist in component V, for example before, during or preferably after the step of filling components Z1 and optionally Z2 into vessels, for example transportation vessels such as drums, intermediate bulk containers (IBCs), being layered onto the surface of the mixture of Z1 and optionally Z2 to cover all or only part of the surface. The aforementioned layering of component V may then preferably be accomplished such that the layer of V may be removed again without major effort; to this end, for example, a gas- and moisture-pervious material which is inert to Z1, optionally Z2 and V may be placed between the mixture of Z1 and optionally Z2 and the layer V to provide an effective separation of V from Z1 and optionally Z2, examples being a porous metallic foil or polymeric sheeting or paper, fibrous nonwoven web, textile.

However, the step of contacting components Z1, optionally Z2 and V may also consist in component V being accommodated separately from and not intimately mixed with the remaining components, for example being placed filled into preferably small containers of a gas- and moisture-pervious material inert to Z1, optionally Z2 and V, examples being a bag of porous metallic foil or polymeric sheeting, or paper, fibrous nonwoven web, textile, for example before, during or preferably after filling components Z1 and optionally Z2 into vessels, for example transportation vessels such as drums, intermediate bulk containers (IBCs), into, under or on the mixture of Z1 and optionally Z2.

The present invention also provides a Z composition comprising a salt of dithionous acid Z1, preferably sodium dithionite, as defined herein including all embodiments, obtainable by a method as described herein.

The present invention also provides the method of using at least one of the following compounds V selected from the group consisting of: (a) oxides of the alkali metals lithium, sodium, potassium, rubidium, cesium, such as $Li_2O$, $Na_2O$, $K_2O$ or of magnesium such as MgO, (b) sodium tetrahydroborate ($NaBH_4$), (c) anhydrous copper(II) sulfate ($CuSO_4$), phosphorus pentoxide and (d) basic amino acids arginine, lysine, histidine for reducing or preventing the decomposition of a composition Z comprising Z1 a salt of dithionous acid in an amount ranging from 50 to 100 wt % and optionally Z2 an additive selected from the group consisting of alkali metal carbonate, alkaline earth metal carbonate, alkali metal or alkaline earth metal tripolyphosphate ($Na_5P_3O_{10}$), alkali metal or alkaline earth metal sulfite, disulfite or sulfate, dextrose and complexing agents in a combined amount ranging from 0.0001 to 40 wt %.

The present invention also provides the method of using the Z composition defined above including all embodiments for bleaching and decolorization of pulp or of fibers for papermaking, of wood, for dyeing of textiles or for textile color production.

The method of the present invention delivers a Z composition which is in accordance with the present invention and which is notable for a significantly lower tendency to decompose, as determined using the procedure described in the examples, and for the resultant enhanced stability in storage and transportation. Even after the Z composition of the present invention has been stored for a prolonged period, preferably at temperatures below 60° C., of for example from 2 to 4 years, its active Z1 assay will typically have decreased by at most 2 wt % as compared with the original assay.

The Z composition of the present invention is very suitable for use in the wood-base or pulp industry, for example for bleaching, in the paper industry and in the manufacture of textile dyes or the dyeing of textiles.

EXAMPLES

The quantification of the sodium dithionite content was in each case done iodometrically.

Example 1a 45 g of sodium dithionite (Hydrosulfit F from BASF SE) comprising from 2 to 4 wt % of sodium carbonate (anhydrous) were mixed, at room temperature and low relative humidity, with a component V, as a dry solid, as reported below in Table 1 and conditioned at 65° C. for 7 days in an ampule vial sealed with an overpressureproof septum. Thereafter, the sodium dithionite content of the conditioned mixture was determined and the flowability thereof evaluated by pouring the conditioned mixture out of the particular ampule vial. Flowability was rated from 0 (utterly caked) to 100 (instantly flowable). The wt % ages reported in Table 1 a are based on the mixture as a whole.

TABLE 1a

| Component V | [Wt %] component V | Sodium dithionite [wt %] | Flowability |
|---|---|---|---|
| — | — | 60-72 | 20-40 |
| Magnesium oxide MgO | 1 | 76 | 80 |
| Sodium oxide $Na_2O$ | 0.5 | 82 | 100 |
| Lithium oxide $Li_2O$ | 1 | 78 | 90 |
| Lithium oxide $Li_2O$ | 0.5 | 77 | 90 |
| Sodium borohydrite $NaBH_4$ | 1 | 91 | 90 |
| Phosphorus pentoxide | 1 | 82 | 90 |
| Copper(II) sulfate ($CuSO_4$) anhydrous | 2 | 83 | 100 |
| Arginine | 1 | 84 | 95 |
| Lysine | 1 | 82 | 90 |

Example 1b

Example 1a was repeated except that the sodium dithionite product contained less than 1 wt % of sodium carbonate (anhydrous). The results are shown in Table 1b. The wt % ages reported in Table 1b are based on the mixture as a whole.

TABLE 1b

| Component V | [Wt %] component V | Sodium dithionite [wt %] | Flowability |
|---|---|---|---|
| Phosphorus pentoxide | 1 | 80 | 90 |

Example 2

50 g of sodium dithionite (Hydrosulfit F from BASF SE) comprising 0.8 wt % of sodium carbonate (anhydrous) were mixed, at room temperature, with a component V, dry as solids, as reported below in Table 4, and filled into 100 ml sealable Schott glass bottles. A plastics sponge drenched with 0.5 ml of water was inserted into each bottle neck and then the Schott glass bottle was sealed tight with the screw lid and stored for 7 days at 30° C. (drying cabinet). Thereafter, the sodium dithionite content of the conditioned mixture was determined and the flowability thereof evaluated by pouring the conditioned mixture out of the particular Schott glass bottle. Flowability was rated from 0 (utterly caked) to 100 (instantly flowable). The wt % ages reported in Table 1 b are based on the mixture as a whole.

TABLE 2

| [Wt %] component V | Component V | Sodium dithionite [wt %] | Flowability |
|---|---|---|---|
| 1 | Phosphorus pentoxide | 78 | 50 |
| 1 | L-Arginine | 86 | 80 |

We claim:
1. A method for reducing or preventing the decomposition of a composition Z
comprising Z1 a salt of dithionous acid in an amount ranging from 50 to 100 wt % and optionally Z2 an additive selected from the group consisting of alkali metal carbonate, alkaline earth metal carbonate, alkali metal or alkaline earth metal tripolyphosphate

($Na_5P_3O_{10}$), alkali metal or alkaline earth metal sulfite, disulfite or sulfate, dextrose and complexing agents in a combined amount when present ranging from 0.0001 to 40 wt %, which comprises contacting the components Z1 and optionally Z2 in the solid and/or dry or solvent-dissolved or -suspended state with at least one of the following compounds V in the solid and/or dry or solvent-dissolved or -suspended state, wherein the compounds V are selected from the group consisting of: (a) oxides of the alkali metals lithium, sodium, potassium, rubidium, cesium, or of magnesium, (b) sodium tetrahydroborate ($NaBH_4$), (c) anhydrous copper(II) sulfate ($Cu(SO_4)$), phosphorus pentoxide and (d) basic amino acids arginine, lysine, histidine, wherein the solvent for Z1, optionally Z2 and V is practically water-free and the solvent comprises less than 1000 wt-ppm of water.

2. The method as defined in claim 1, wherein the salt of dithionous acid Z1 is sodium dithionite.

3. The method according to claim 1, wherein the compound V is used in a total amount ranging from 0.01 to 0.9 wt %, based on the composition Z, except for sodium tetrahydroborate ($NaBH_4$), which may also be present in a total amount ranging from 0.01 to 5 wt %.

4. The method according to claim 2, wherein the compound V is used in a total amount ranging from 0.01 to 0.9 wt %, based on the composition Z, except for sodium tetrahydroborate ($NaBH_4$), which may also be present in a total amount ranging from 0.01 to 5 wt %.

5. The process according to claim 4, wherein Z2 is present.

6. The process according to claim 1, wherein Z1 is present from 70 to 95 wt. %, all based on the composition of Z.

7. The process according to claim 5, wherein Z1 is present from 70 to 95 wt. %, all based on the composition of Z.

8. The process according to claim 1, wherein Z2 is present from 0.0001 to 10 wt. %, all based on the composition of Z.

9. The process according to claim 7, wherein Z2 is present from 0.0001 to 10 wt. %, all based on the composition of Z.

10. The process according to claim 1, wherein Z2 is present from 1 to 5 wt. %, all based on the composition of Z.

11. The process according to claim 9, wherein Z2 is present from 1 to 5 wt. %, all based on the composition of Z.

12. The method according to claim 1, wherein the solvent comprises less than 100 wt-ppm of water.

13. The method according to claim 11, wherein the solvent comprises less than 100 wt-ppm of water.

* * * * *